Patented Feb. 11, 1936

2,030,273

UNITED STATES PATENT OFFICE 2,030,273

PROCESS FOR THE PURIFICATION OF MATERIALS CONTAMINATED WITH AMMONIUM SALTS

George Stevens Simpson, Plainfield, N. J., assignor to General Chemical Company, New York, N. Y., a corporation of New York No Drawing. Application September 13, 1933, Serial No. 689,267

5 Claims. (Cl. 23—97)

This invention relates to a process for the purification of materials contaminated with ammonium salts. More particularly, this invention relates to a process for the purification of zinc chloride from ammonium salts whereby white zinc chloride containing a relatively small amount of an ammonium salt as compared with that originally present may be prepared.

Sal skimmings is a by-product obtained from galvanizing operations which contains zinc (both in the form of metallic zinc and in the form of zinc chloride), ammonium chloride and numerous other materials in varying proportions. In working up sal skimmings for the production of zinc chloride, the skimmings are customarily dissolved in hydrochloric acid, the solution treated for the removal of impurities such as iron salts, and the resulting solution containing principally zinc chloride and ammonium chloride is then evaporated to produce a technical zinc chloride. The zinc chloride product as thus obtained contains a considerable quantity of ammonium chloride as an impurity and is of a dark color.

It is an object of this invention to provide a process whereby a material such as zinc chloride contaminated with an ammonium salt may be purified of the ammonium salt. It is a further object of this invention to provide a process whereby zinc chloride recovered from solutions of the same containing impurities may be obtained in the form of a white solid.

In carrying out the process of this invention a material contaminated with an ammonium salt is mixed with nitric acid and the mixture heated to decompose the ammonium salt content of the mixture. The nitric acid is preferably added to a solution in water of the impure material, the nitric acid reacting with ammonium salts present in the solution to form ammonium nitrate which upon heating to a temperature above about 210° C. is decomposed and the decomposition products evolved from the heated material. In the recovery of zinc chloride from solutions of the same obtained from sal skimmings, nitric acid is added to the preliminarily purified solution which still contains ammonium chloride and the solution is heated to concentrate it and form a fused zinc chloride product. During this heating to evaporate water, the temperature of the liquid increases to about 325° C. The ammonium nitrate formed by the treatment with nitric acid is decomposed at temperatures above about 210° C. and the decomposition products are volatilized. The zinc chloride product thus obtained by the process of this invention not only contains a relatively small ratio of ammonium chloride to zinc chloride as compared with the ratio of these materials in the solution prior to treatment with the nitric acid, but is a white product rather than the dark gray material obtained from the process which does not include the nitric acid treatment of this invention. A further advantage of utilizing the process of this invention is that the zinc chloride product obtained contains a smaller proportion of basic zinc chloride than does the product resulting from the evaporation of zinc chloride solutions without addition of nitric acid under comparable conditions of evaporation and fusion.

The following example is illustrative of the process of this invention:

Nitric acid is added to a 50% to 55% zinc chloride solution containing, for example, about 8 parts by weight of ammonium chloride for every 100 parts of zinc chloride. The nitric acid may be added in the form of a 45–95% aqueous solution of $HNO_3$ and in amount such that about 11 parts of $HNO_3$ are present in the solution for every 100 parts of zinc chloride. This amount of acid is somewhat in excess of that required for reaction with the ammonium chloride present in accordance with the equation:

$$HNO_3 + NH_4Cl = HCl + NH_4NO_3.$$

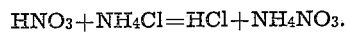

The excess of acid acts upon impurities present other than the ammonium chloride and represses the formation of basic salt during the treatment of the solution to obtain a fused zinc chloride. The solution containing nitric acid is then heated to evaporate water from the solution until the water content has been reduced to less than 1%, during which heating the temperature gradually rises with loss of water until it reaches about 325° C. The concentrated fusion of zinc chloride may then be cooled to solidify it. The resulting white solid zinc chloride product contains ammonium chloride and zinc chloride in the proportions of about 1.5 parts by weight of ammonium chloride for every 100 parts of zinc chloride, whereas this ratio in the original solution before treatment with nitric acid was, as noted above, about 8 to 100. It also contains substantially no zinc oxide whereas by evaporating the zinc chloride as described, without the addition of nitric acid, the product obtained contains about 1.7 parts of zinc oxide for every 100 parts of zinc chloride.

The nitric acid may be added to the zinc chloride solution either directly as nitric acid or may be formed in situ, as for example, nitrogen oxides of a state of oxidation higher than that corresponding to $N_2O_3$, may be passed into the solution of zinc chloride in desired amount and the solution then evaporated. For example, a gaseous mixture of oxides of nitrogen obtained from oxidizing ammonia with air and containing chiefly nitrogen, $NO_2$, $N_2O_4$ and $N_2O_5$, may be passed into the zinc chloride solution containing ammonium salts and the solution then evaporated. In so operating the nitrogen oxides are absorbed by the solution with the formation of nitric acid which acts like nitric acid added as such to the solution to decompose the ammonium salts present. A mixture of nitrogen oxides containing oxides of a higher state of oxidation than that corresponding to $N_2O_3$ obtained by the catalytic oxidation of ammonia with air and cooled to a temperature of about 96–98° F. was passed through a solution of zinc chloride containing about 8.1 parts of ammonium chloride and about 1.7 parts of zinc oxide for every 100 parts of zinc chloride. The solution was then heated to evaporate it to dryness with the formation of a fusion of zinc chloride and the fusion cooled to solidify it. The resulting product was white. It contained no ammonium chloride and only about .4 part of zinc oxide for every 100 parts of zinc chloride. Similar results may be obtained utilizing the oxides of nitrogen prepared by the reaction of metallic copper and nitric acid followed by oxidation with air of the oxides thus obtained.

In the above example, the soluton treated with nitric acid is one which has been preliminarily treated for the removal of impurities such as iron salts. If desired, this preliminary purification may also be accomplished by means of nitric acid added to the solution obtained by dissolving the sal skimmings in hydrochloric acid. The nitric acid is added to this solution and the solution boiled to oxidize the ferrous salts to ferric salts. By neutralizing the acidity of the solution with dry zinc skimmings for example, or crude zinc oxide, the iron is precipitated as the hydroxide which may be removed by filtration. The filtrate (solution of zinc chloride containing ammonium chloride) is then treated as described above, to purify it of the ammonium chloride and recover a fused zinc chloride product.

As noted above in carrying out the process of this invention, nitric acid may be added as such to an impure solution of zinc chloride or may be formed in the solution by reaction of substances forming nitric acid. Accordingly, when in the claims reference is made to adding nitric acid to a material or a solution of the same, it is intended to refer to any operation whereby the desired nitric acid content in the impure solid or solution is obtained irrespective of the manipulative procedure followed for accomplishing this result.

I claim:

1. The process of purifying zinc chloride containing an ammonium salt as an impurity which comprises adding nitric acid to the impure zinc chloride and heating the thus treated material at a temperature at which the ammonium salt therein is decomposed.

2. The process for the recovery of relatively pure zinc chloride from a solution of the same containing ammonium salts which comprises introducing nitric acid into said solution and heating the solution to evaporate water therefrom and to heat the solution to a temperature at which the ammonium salt therein is decomposed.

3. The process for the recovery of a relatively pure zinc chloride from an impure solution of the same obtained by the treatment of sal skimmings with hydrochloric acid which comprises introducing nitric acid into said solution and heatng the solution to evaporate water therefrom until a substantially dry melt is obtained and ammonium salt in the solution is decomposed.

4. The process for the recovery of relatively pure zinc chloride from a solution of the same containing ammonium salts which comprises introducing nitric acid into said solution and heating the solution to a temperature above about 210° C. to evaporate water therefrom and free it of ammonium salts.

5. The process for the recovery of a relatively pure fused zinc chloride from an impure solution of the same obtained by the treatment of sal skimmings with hydrochloric acid which comprises introducing nitric acid into said solution in excess of the amount required to react with the ammonium salt present in the solution and heating the solution to evaporate water therefrom until a temperature of about 325° C. is attained, thereby obtaining a substantially dry melt of pure zinc chloride.

GEORGE STEVENS SIMPSON.